(12) United States Patent
Bestle

(10) Patent No.: US 7,003,266 B2
(45) Date of Patent: Feb. 21, 2006

(54) PORTABLE ELECTRONIC DEVICE WITH FOLDABLE DISPLAY AND HIDE-AWAY KEYBOARD

(75) Inventor: Nikolaj Heiberg Bestle, Calabasas, CA (US)

(73) Assignee: Nokia Corporation, Espoo (FI)

( * ) Notice: Subject to any disclaimer, the term of this patent is extended or adjusted under 35 U.S.C. 154(b) by 843 days.

(21) Appl. No.: 09/896,237

(22) Filed: Jun. 29, 2001

(65) Prior Publication Data

US 2003/0003878 A1    Jan. 2, 2003

(51) Int. Cl.
*H04M 1/00* (2006.01)

(52) U.S. Cl. ............. 455/90.3; 455/556.1; 379/433.12

(58) Field of Classification Search .. 455/556.1–556.2, 455/90.3; 345/168, 169, 659, 864, 901; 379/433.12, 379/433.13, 433.04, 433.06
See application file for complete search history.

(56) References Cited

U.S. PATENT DOCUMENTS

| | | | |
|---|---|---|---|
| 4,736,294 A | 4/1988 | Gill et al. | |
| 4,742,457 A | 5/1988 | Leon et al. | |
| 4,839,804 A | 6/1989 | Roberts et al. | |
| 4,953,085 A | 8/1990 | Atkins | |
| 5,689,650 A | 11/1997 | McClelland et al. | |
| 5,832,461 A | 11/1998 | Leon et al. | |
| 5,852,811 A | 12/1998 | Atkins | |
| 5,864,828 A | 1/1999 | Atkins | |
| 5,875,437 A | 2/1999 | Atkins | |
| 5,878,405 A | 3/1999 | Grant et al. | |
| 5,884,285 A | 3/1999 | Atkins | |
| 5,898,774 A * | 4/1999 | Shindo ................. | 379/433.13 |
| 5,907,828 A | 5/1999 | Meyer et al. | |
| 5,911,135 A | 6/1999 | Atkins | |
| 5,911,136 A | 6/1999 | Atkins | |
| 6,009,415 A | 12/1999 | Shurling et al. | |
| 6,012,047 A | 1/2000 | Mazonas et al. | |
| 6,052,673 A | 4/2000 | Leon et al. | |
| 6,108,641 A | 8/2000 | Kenna et al. | |
| 6,148,293 A | 11/2000 | King | |
| 6,188,993 B1 | 2/2001 | Eng et al. | |
| 6,483,445 B1 * | 11/2002 | England ...................... | 341/22 |
| 6,768,635 B1 * | 7/2004 | Lai et al. .................... | 361/680 |
| 2002/0021258 A1 * | 2/2002 | Koening | |
| 2002/0021622 A1 * | 2/2002 | Baroche | |
| 2002/0158812 A1 * | 10/2002 | Pallakoff | |

FOREIGN PATENT DOCUMENTS

| | | | |
|---|---|---|---|
| GB | 2257554 | * | 1/1993 |
| JP | 63313270 | | 12/1988 |
| JP | GB 2260844 | * | 4/1993 |
| JP | 5257953 | | 10/1993 |
| TW | GB 2360622 | * | 9/2001 |
| US | EP 0898223 | * | 2/1999 |
| WO | WO9739415 | | 10/1997 |
| WO | WO 73933 | | 12/2000 |

OTHER PUBLICATIONS

Product Information for "OpenPlus Fixed Assets" (04/16/01).

(Continued)

*Primary Examiner*—William J. Deane, Jr.
(74) *Attorney, Agent, or Firm*—Jerald J. Gnuschke; Steven A. Shaw

(57) ABSTRACT

A portable electronic device with a stowable assembly. The stowable assembly may be stowed substantially within the housing of the portable electronic device. In the presently preferred embodiment, the stowable assembly has a display and a hide-away keyboard having at least one key.

12 Claims, 3 Drawing Sheets

OTHER PUBLICATIONS

Product Information for "Lease Accounting Management System" (04/16/01).

Product Information for "Concert Series 5.0" (Apr. 16, 2001).

Product Information for "TIMESPAN-MUNI Lease Management System 3.08" (Apr. 16, 2001).

Product Information for "Paragon Information Consulting Inc." (Apr. 16, 2001).

Product Information for "Micro-LMS 2.0" (Apr. 16, 2001).

Product Information for "LeasTrac 2000" (Apr. 16, 2001).

Accurate Auto Lease and Loan Software from Lease Wizard® at http://www.leasewizard.com/welcome.cfm.

Print Out of Information from website of IFSLeaseWorks (pp. 1-7) at http://ifsleaseworks.com/ifsnewweb/prod_baseapp.html; and http://ifsleaseworks.com/ifsnewweb/prod_options.html.

Print Out of Technology Information from the website of PanCredit at http://www.pancredit.com/product/technology_body.html.

Product overview of TURBO-Lease at http://www.betterprograms.com/overview.html.

Product information for Accelio Corporation (formerly Jet Form Corporation) at http://jetform.com and http://www.accelio.com.

Information regarding LeasePlus Modules™ software at http://www.leaseteam.com/module.html (34 pages total).

"SuperTRUMP Financial Modeling" information at http://ivorycc.com/super.html.

McCue Systems, Inc.—"Demonstration CD" at http://www.mccue.com/demo/index.html.

* cited by examiner

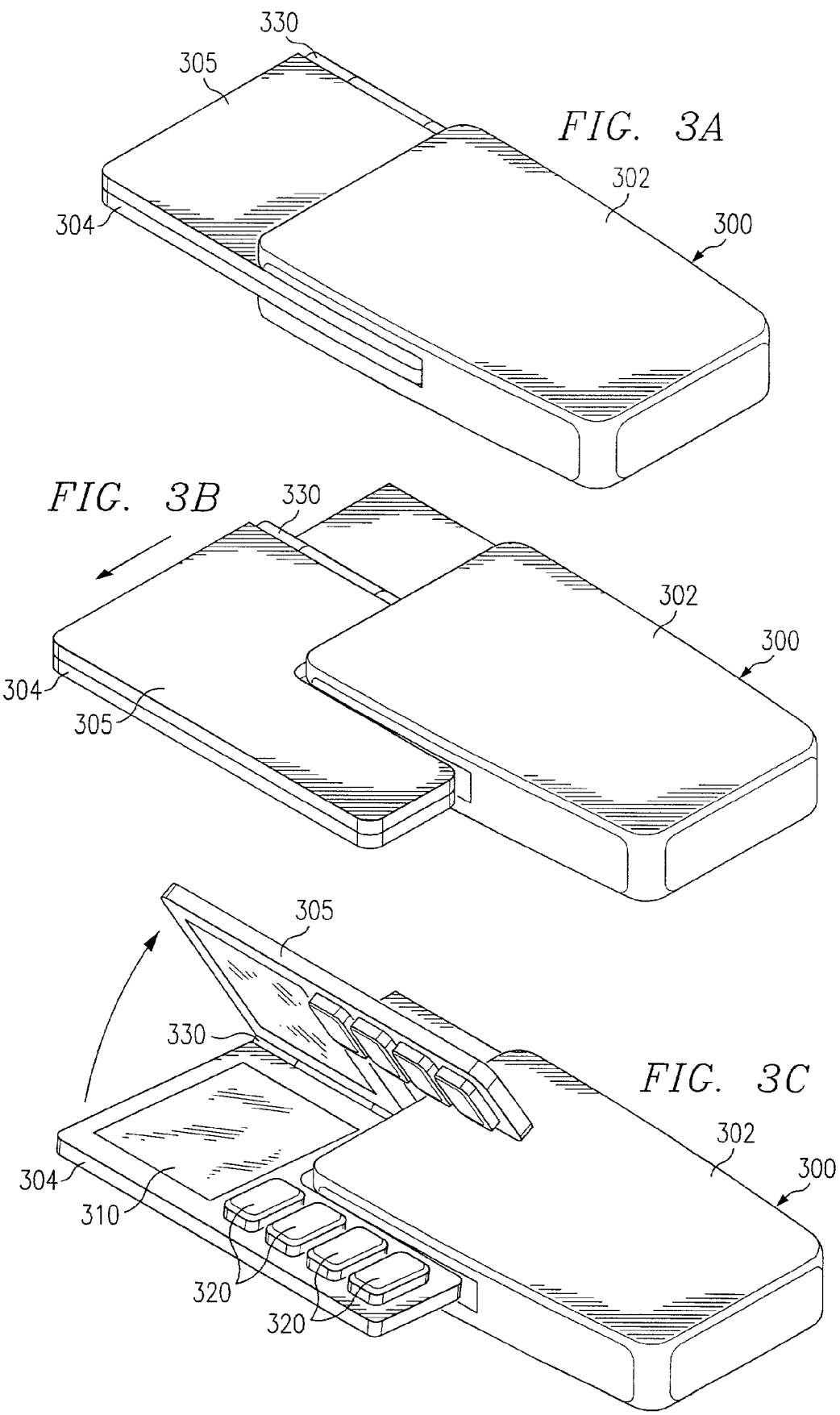

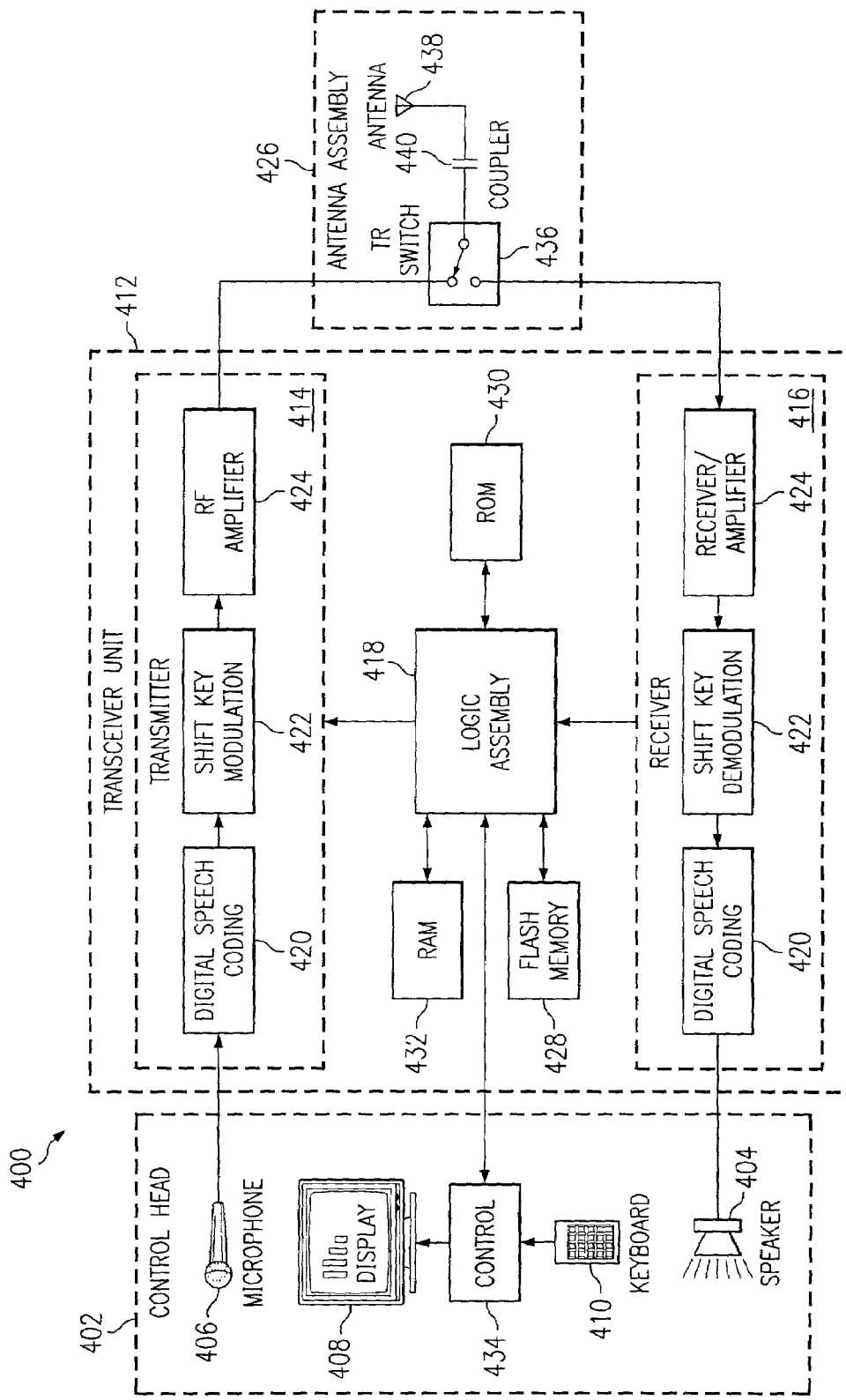

PORTABLE ELECTRONIC DEVICE WITH FOLDABLE DISPLAY AND HIDE-AWAY KEYBOARD

FIELD OF THE INVENTION

This invention relates to portable electronic devices and, more particularly, to compact input/output systems, such as displays and keyboards, for use with portable electronic devices.

BACKGROUND

Mobile communication devices generally have a data input device such as a keyboard, for inputting data to the mobile device's controller, and a data output device such as a display, for communicating data from the controller to the mobile device's user. Both the data input device and data output device are typically a fixed, integral part of the mobile communication device. For example, in a conventional mobile cellular telephone, the keypad is fixed in one location on the case of the cellular telephone, as is the display.

Due to the small size of most mobile communication devices, integral data input and output devices are generally small and difficult to use. For example, the typical cellular telephone keypad and display are constrained by the size of the cellular telephone. As future cellular telephones continue to get smaller, so too must their integral keypads and displays. As the keypads become ever smaller, they become more difficult to manipulate. As the displays become ever smaller, they become more difficult to read. Thus, it would be advantageous to have a keypad and display that are not constrained by the size of the portable electronic device to which they are attached.

FIG. 1 shows a conventional cellular mobile telephone 100. Cell phone 100 has a display 110, which is typically used to show information to the user, such as dialed phone numbers. Cell phone 100 also has a keypad 120 with a plurality of keys 130. The keys 130 are generally small and difficult to manipulate, especially if cell phone 100 is small. Using the display 110 to show complex graphics or lengthy strings of text can be difficult, due to the limitations on the size of the display that are necessarily imposed by the form of the cellular telephone 100. Thus, it would be advantageous to create an input device and an output device for a portable electronic device that are not strictly limited by the size of the portable electronic device with which they are used.

Past efforts to create an input device that is not limited by the size of the portable electronic device which contains it have resulted in inventions such as the voice-activated cellular telephone. Voice-activated dialing solutions suffer from the disadvantage that voice recognition software is imperfect. Voice control systems also require considerable processing power and memory storage, both of which are typically in short supply in a portable device. Thus, it would be an advantage to create a reliable input device that allows ease of use but does not require excessive processor and memory resources from the portable electronic device.

Past efforts to create an output device that is not limited by the size of the portable electronic device that contains it have resulted in inventions such as the "virtual display." Virtual display systems generally function in one of two ways both of which require the user to wear special glasses, either that have lenses which are used as miniature displays that are easy to read due to their proximity to the eye or that have lasers that "paint" an image onto the retina of the eye, thereby creating the illusion of a large display hanging in space in front of the user. Virtual display systems have the disadvantage that they require the user to wear, and keep track of, glasses. Thus it would be an advantage to create a display system that is not strictly limited by the size of the portable device that contains it, yet does not require that the user wear, or keep track of, extra components.

SUMMARY OF THE INVENTION

Various embodiments of the invention disclose a portable electronic device with a movable assembly that is capable of being stowed substantially within the form factor of the portable electronic device. The assembly is typically an input and/or output device for use with the portable electronic device.

The presently preferred embodiment of the invention is a hinged, foldable, slide-away assembly having a keyboard and display for use with a portable electronic device. In the stored position, the assembly is substantially disposed within the case of the portable electronic device. The keyboard is slidably coupled to the case of the portable electronic device and can be stowed and unstowed by sliding the assembly out of the case and unfolding it. The preferred embodiment discloses a split screen display that can be used advantageously with various software applications, as discussed more completely in the detailed description of the preferred embodiment.

Because the assembly provides more surface area for input and output devices when it is unstowed, embodiments of the disclosed invention are also beneficial for users who have difficulty manipulating small keyboards.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 3A–3C show how the presently preferred embodiment of the invention is utilized in a portable electronic device FIG. 3A depicts a device with the innovative input/output devices in the stored position.

FIG. 3B shows how the presently preferred embodiment of the innovative input/output device slides out from the stored position shown in FIG. 3A.

FIG. 3C shows how the presently preferred embodiment of the innovative input/output device is unfolded from the position shown in FIG. 3B to the "in-use" position shown in FIG. 2.

FIG. 4 shows a block diagram of a mobile station capable of implementing the presently preferred embodiment.

DETAILED DESCRIPTION OF THE PRESENTLY PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
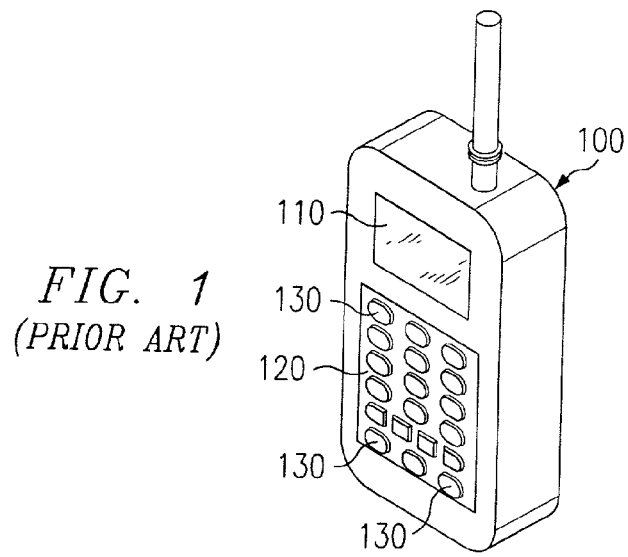
FIG. 1 shows a prior art portable cellular telephone in which are disposed a traditional keyboard and display.
Figure 2:
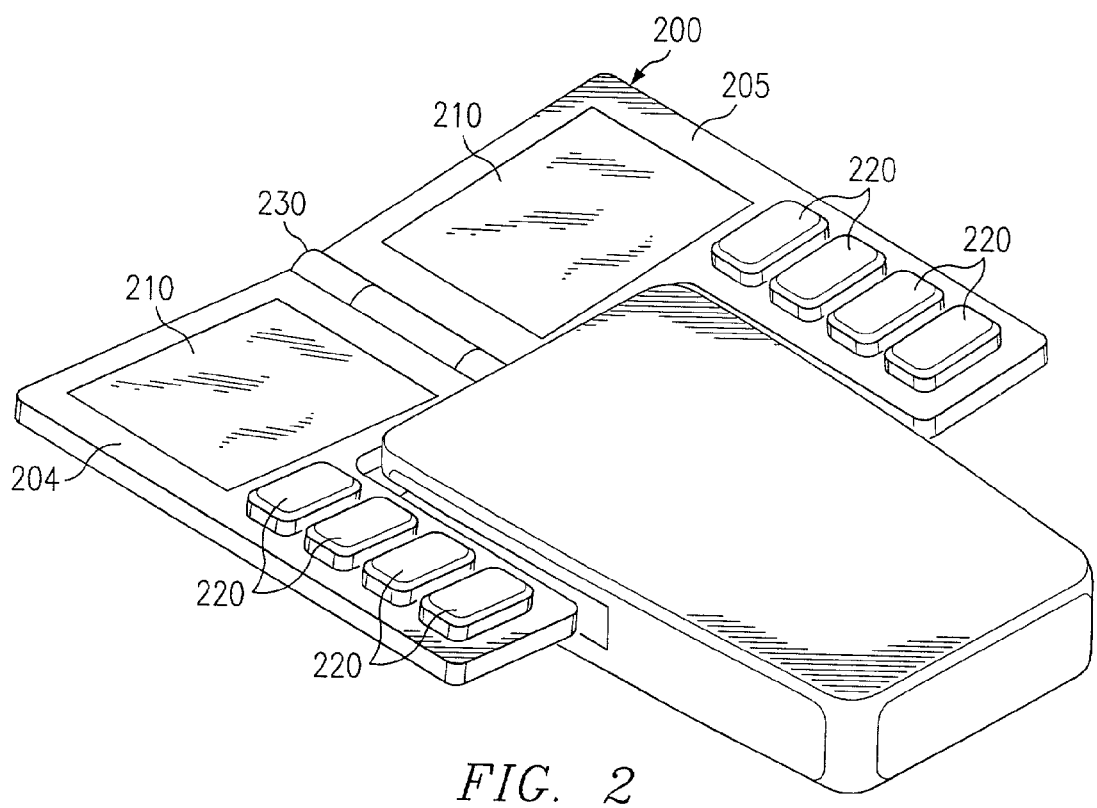
FIG. 2 depicts a top view of the presently preferred embodiment of a portable electronic device that implements the disclosed innovations.

FIG. 2 depicts the top view of the presently preferred embodiment 200 of the invention. A hinge 230 joins panel 204 to panel 205. An output device 210 and at least one input device 220 are disposed on each panel 204, 205. In the preferred embodiment shown, the output device 210 is a display and the input device 220 is a key. In the preferred embodiment shown, each panel 204, 205 has four keys 220 and one display 210. However, in other embodiments it is not necessary that the panels 204, 205 have both an input device 220 and output device 210. An additional advantage of the preferred embodiment is that many software applications can be enhanced by dividing the graphical user interface into two screen areas. For example: in video-conferencing applications it is useful to have the local camera in one screen and the "far end" camera in the other screen; in calendar applications it is useful to have a monthly navigator in one screen and a daily view in the other screen; and in a "contacts" organizer it is useful to have a list of persons in one screen and detailed information about the currently selected person in the other screen.

FIGS. 3A–C show how the preferred embodiment disclosed in FIG. 2 is unstowed from the stored position. FIG. 3A shows the portable electronic device 300 with panels 304 and 305 in the stored position. Case 302, typically constructed of plastic or light metal, physically encloses the electronic components of portable electronic device 300. Panel 304 is joined to panel 305 by hinge 330. FIG. 3B shows how panels 304 and 305 slide out of case 302 of portable electronic device 300. FIG. 3C shows how panels 304 and 305 rotate about hinge 330 into the "in-use" position depicted in FIG. 2. In this presently preferred embodiment, an output device 310 and input device 320 are disposed on panels 304 and 305. In the embodiment shown, output device 310 is a display and input device 320 is a key.

FIG. 4 depicts a block diagram of a mobile station 400 that can make use of the disclosed embodiments. Although the invention is discussed in the context of a mobile station for exemplary purposes, any suitable electronic device, such as a portable computer or personal digital assistant (PDA), may implement the innovative data input/output device disclosed herein. The mobile station 400 includes, in this example:

An input/output device 402 containing an audio interface, i.e. a speaker 404 and microphone 406. The input/output device 402 generally includes at least one display assembly 408 allowing a user to see dialed digits, stored information, messages, calling status information, including signal strength, etc. The input/output device 402 generally includes at least one keypad 410, or other user control device, allowing a user to dial numbers, answer incoming calls, enter stored information, and perform other mobile station functions. In the context of the preferred embodiment of the disclosed invention, input/output device 402 is a "hideaway" unit that may be folded and disposed within the mobile station 400. The input/output device 402 also has a controller unit 434 that interfaces with a logic control assembly 418 responsible, from the control unit perspective, for receiving data and commands from the keypad 410 or other control devices, such as the disclosed invention, and providing status information, alerts, data, and other information to the display assembly 408;

A transceiver unit 412 includes a transmitter unit 414, receiver unit 416, and the logic control assembly 418. The transmitter unit 414 converts low-level audio signals from the microphone 406 to digital coding using a codec (a data coder/decoder) 420. The digitally encoded audio is represented by modulated shifts, for example, in the frequency domain, using a shift key modulator/demodulator 422. Other data received from the logic control assembly 418, such as station parameters and control information, may also be encoded for transmission. The modulated signal is then amplified by RF amplifier 424 and transmitted via an antenna assembly 426;

The antenna assembly 426 contains a TR (transmitter/receiver) switch 436 to prevent simultaneous reception and transmission of a signal by the mobile station 400. The transceiver unit 412 is connected to the antenna assembly 426 through the TR switch 436. The antenna assembly contains at least one antenna 438 coupled to TR switch 436 by coupler 440;

A receiver unit 416 receives a transmitted signal via the antenna assembly 426. The signal is amplified by receiver/amplifier 424 and demodulated by shift-key demodulator 422. If the signal is an audio signal, it is decoded using the codec 420. The audio signal is then reproduced by the speaker 404. Other signals, such as remote data input from the present invention are handled by the logic control assembly 418 after demodulation by demodulator 422; and A logic control assembly 418 usually containing an application specific integrated circuit (or ASIC) combining many functions, such as a general purpose microprocessor, digital signal processor, and other functions, into one integrated circuit. The logic control assembly 418 coordinates the overall operation of the transmitter and receiver using control messages. The various disclosed embodiments would make use of the logic control assembly 418 to update the display 408 and accept input from the keypad 410. Generally, the logic control assembly 418 operates from a program that is stored in flash memory 428 of the mobile station. Flash memory 428 allows upgrading of operating software, software correction or addition of new features. Flash memory 428 is also used to hold user information such as speed dialing names and stored numbers.

In addition to flash memory 428, the mobile station 400 will typically contain read only memory (ROM) 430 for storing information that should not change, such as startup procedures, and random access memory (RAM) 432 to hold temporary information such as channel number and system identifier.

As will be recognized by those skilled in the art, the innovative concepts described in the present application can be modified and varied over a tremendous range of applications, and accordingly the scope of patented subject matter is not limited by any of the specific exemplary teachings given.

For example, although the various embodiments have generally been discussed in the context of keypads or keyboards, one skilled in the art understands that the invention is equally applicable to keypads and keyboards. Therefore, for purposes of this application, the terms keypad and keyboard are considered synonymous.

For example, although the invention has primarily been discussed in the context of a portable device with a foldable keyboard and display, one skilled in the art understands that the disclosed innovation could be used with either an input device or an output device, rather than requiring both an input device and output device. For example, a foldable hide-away display could be implemented in a portable device with a traditional keyboard, or vice-versa.

Although the input and output devices have primarily been discussed in the context of keyboards and displays, one skilled in the art understands that the invention is equally applicable to a variety of input and output devices such as, for example, speakers and touchpads.

What is claimed is:

1. A portable electronic device, comprising:
   a case with a receivable housing;
   a controller;
   a data input device, coupled to said case, for inputting data to said controller;
   a data output device, coupled to said case, for displaying data from said controller:
   wherein said data input device and said data output device are disposed in one panel each respectively and said panels are coupled via a hinge and are configured to be slidably stored substantially within said receivable housing of said case when in a folded and stowed position and partially surrounding said portable electronic device when in an unfolded and unstowed position.

2. The portable electronic device of claim 1, wherein said data input device is a keyboard, said keyboard having at least one key.

3. The portable electronic device of claim 1, wherein said data output device is a first display.

4. The portable electronic device of claim 1, further comprising a second data output device.

5. The portable electronic device of claim 4, wherein said second date output device comprises a second display configure to provide a video conferencing function wherein a local camera image is displayed on said first display and a far end camera image is displayed on said second display.

6. The portable electronic device of claim 1, further comprising a second data input device.

7. The portable electronic device of claim 6, wherein said second data input device comprises a keypad having at least on key.

8. A mobile station, comprising:
   a case with a receivable housing; and
   an assembly of panels each panel comprising at least one input device and at least one output device providing a user interface to said mobile station, said panels configured to partially surround said mobile station when said assembly is in an unfolded position, said assembly is coupled to said case and storable substantially within said receivable housing of said case when assembly is in a folded and stowed position;
   wherein said assembly is configured to slide out of said receivable housing of said case and unfold, wherein a surface area for a user to interface with said mobile station via said input/output devices is increased when assembly is in an unfolded position.

9. The mobile station of claim 8, wherein said assembly comprises a keypad.

10. The mobile station of claim 8, wherein said assembly comprises a display.

11. The mobile station of claim 8, wherein said assembly comprises a speaker.

12. A phone, comprising:
    a case with a receivable housing;
    a controller; and
    a plurality of panels for displaying information received from said controller,
    wherein a display are disposed in and at least one input device one panel each respectively and said panels are couple via a hinge and configured to be slidably stored within said receivable housing of said case when in a folded and stowed position and partially surrounding said portable electronic device when in an unfolded and unstowed position.

\* \* \* \* \*